United States Patent [19]

Wilson et al.

[11] Patent Number: 5,056,804
[45] Date of Patent: Oct. 15, 1991

[54] FOLDING LOUNGE CHAIR AND CART

[76] Inventors: Beverly C. Wilson; Kenneth L. Wilson, both of 3525 Blvd. Chatelaine, Delray Beach, Fla. 33445

[21] Appl. No.: 550,289

[22] Filed: Jul. 9, 1990

[51] Int. Cl.[5] .............................................. B62B 1/04
[52] U.S. Cl. ...................................... 280/30; 280/640; 280/643; 280/652
[58] Field of Search ................... 280/30, 639, 47.18, 280/638, 47.32, 640, 40, 652, 654, 655, 659, 643; 297/118, 129, 130, 131, 335, DIG. 4

[56] References Cited

U.S. PATENT DOCUMENTS

| | | | |
|---|---|---|---|
| 3,693,993 | 10/1972 | Mazzarelli | 280/30 |
| 4,323,260 | 4/1982 | Suchy | 280/47.25 |
| 4,376,547 | 3/1983 | Dominko | 280/30 |
| 4,521,054 | 6/1985 | Deconick | 297/357 |
| 4,533,151 | 8/1985 | Maitland | 280/30 |

*Primary Examiner*—Andres Kashnikow
*Assistant Examiner*—Richard Camby
*Attorney, Agent, or Firm*—Alvin S. Blum

[57] ABSTRACT

A device that folds flat and compact for storage opens to a folding lounge chair with an adjustable angle backrest. The device includes a backrest frame and a seat frame across which is stretched a fabric web to support an occupant. The two frames are joined at one end by an adjustable angle hinge. At a second end of the backrest frame is a handle. At a second end of the seat frame is a pair of wheels on an axle suspended below the seat. Folding U-shape support members can be extended transverse to the frame to hold the chair above a supporting surface. The frames can be opened to lie in a common plane and the chair turned over to form a rolling cart with one or more support members extended to hold items for transporting with the wheels down, the handle up and what had been the under surface of the fabric web now serving as the upper surface to support items.

8 Claims, 1 Drawing Sheet

U.S. Patent Oct. 15, 1991 5,056,804
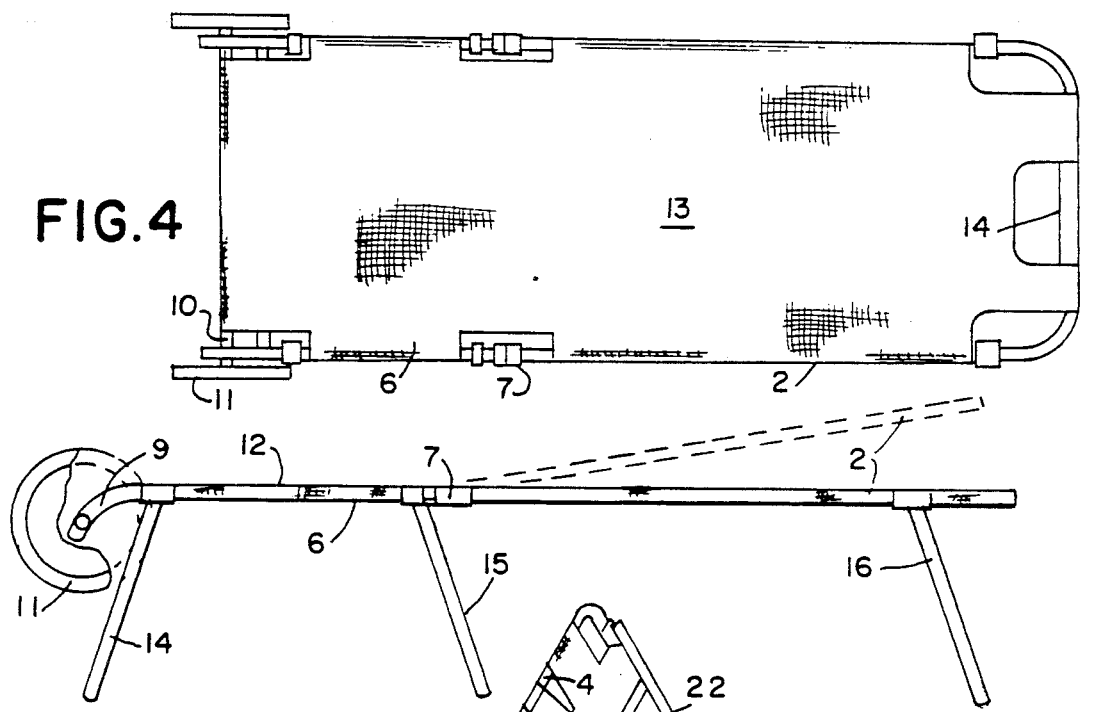
FIG. 4
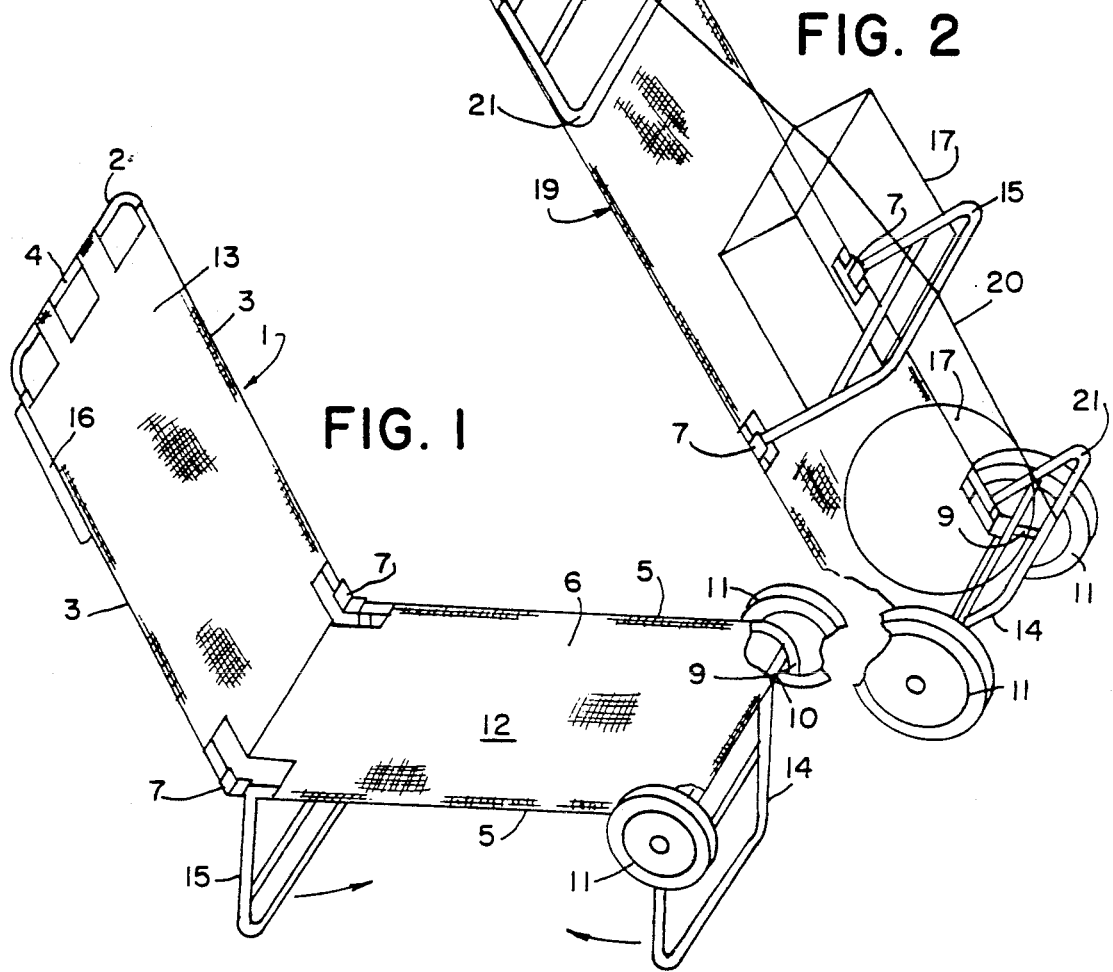
FIG. 3
FIG. 2
FIG. 1

FOLDING LOUNGE CHAIR AND CART

FIELD OF THE INVENTION

This invention relates to wheeled carts and more particularly to a wheeled cart that converts into a lounge chair and also folds up for easy transport and storage.

Background of the Invention

Chaise lounges with adjustable angle backrests have found widespread application as lawn, poolside and patio furniture. Those having a pair of wheels at the adjustable angle with the backrest as exemplified by U.S. Pat. No. 4,521,054 issued Jun. 4, 1985, to Deconinck, have become more popular for their ease of movement from place to place. U.S. Pat. No. 4,323,260 issued Apr. 6, 1982, to Suchy teaches a folding beach chair of this type with a short seat in place of the long seat of a typical chaise lounge and an elongate backrest which forms a handle for rolling the device about. A folding support leg that stabilizes the seat when in use as a chair folds out of the way for use of the device as a cart for transporting items. The elongate backrest folds up when the device is folded to a compact shape for storage. U.S. Pat. No. 3,693,993, issued Sep. 26, 1972, to Mazarelli et al. discloses a beach tote cart with a large removable roller at one end that can serve as a chair or cot. Unfortunately, the roller interferes with chair use unless removed.

Those folding rolling chairs that have wheels at the junction of seat and backrest put the dirty wheels in close proximity to the occupant's clothing when the wheels are large enough to be useful on soft sand.

A chair that puts the wheels out of the way of the occupant and that folds into a convenient small package while also serving as a rolling cart would meet needs not met by the devices of the prior art.

SUMMARY OF THE INVENTION

It is accordingly an object of the invention to provide a folding, adjustable lounge chair that can also function as a wheeled cart in which the wheels do not interfere with the use as a chair. It is another object that the cart be capable of conveniently holding the many items that must often be transported from the vehicle to the beach sand to make a beach outing successful.

The wheeled cart and lounge chair of the invention comprises a rigid seat frame hingedly connected at a first end to a rigid backrest frame by adjustable hinge means that can fix the angle therebetween at a variety of selectable angles including 180°. A flexible fabric or mesh panel stretched across the frames provides a surface to support the reclining occupant. A pair of wheels attached to a second end of the seat frame rotate about a common axis. That axis is disposed in a plane below the plane of the seat so that the wheels do not project excessively into the plane of the seating frame. A plurality of folding supporting leg members are pivotally attached to the frame and arranged to fold into coplanar relationship with the frames for folding storage and to extend perpendicular to the frames for supporting the frames above a support surface when used as a chair.

For use as a cart, the two frames are arranged in a common plane and inverted from the seating position with the wheels on the ground and the combined frames providing a long support for goods with the end of the backrest frame serving as a handle that can be held without stooping. The folding support leg member closest to the wheels is extended to hold the goods at the lowermost point. These and other objects, advantages and features of the invention will become more apparent when the detailed description is read in conjunction with the drawings.

BRIEF DESCRIPTION OF THE DRAWINGS

FIG. 1 is a perspective view of the invention in use as a chair.

FIG. 2 is a perspective view of the invention in use as a cart.

FIG. 3 is a side view of the invention in use as a chair in fully reclined position.

FIG. 4 is a top view of the lounge chair of the invention in fully reclined position.

DETAILED DESCRIPTION OF THE PREFERRED EMBODIMENT

Referring now first to FIGS. 1, 3 and 4, a reclining lounge chair 1 includes a backrest 2 frame with a U shape having a pair of parallel sides 3 joined at one end to a handle end piece 4. The second ends of the sides are joined to the sides 5 of a seat frame 6 by adjustable hinge elements 7 that can be arranged to hold the two frames securely at selected angles between zero and 180 degrees so that the backrest 2 can be in the same plane as the seat 6 as shown in FIGS. 3 and 4 or tilted for sitting upright as shown in FIG. 3 in phantom and in FIG. 1. The sides 5 of the seat frame 6 are bent downward at the ends 9 remote from the hinge 7. An axle 10 is mounted in holes in the ends. A pair of wheels 11 are journalled on the axle 10. Because the axle is below the plane 12 of the seat frame, the wheels do not extend very far above that plane, and they are at the extreme end of the chair where they do not interfere with use of the chair.

A fabric panel 13 is stretched across the frames 26, and the axle 10 to support the weight of the occupant. It is held in place by means well known in the art and may be removable for cleaning. The panel may be mesh, woven webbing or other suitable webs as desired.

Folding support leg members 14, 15, 16 are pivotally connected to the sides of the frame so that they may be folded flat against the frames or extended transverse to the frames for supporting the chair above the support surface such as beach sand, patio and the like. When the frames are adjusted at an angle of 180° so that they are in a common plane and the device turned over, the device now becomes a rolling cart 19 for transporting items to the beach, pool and the like, as shown in FIG. 2. The support leg member 16 is folded down and leg member 14 and optionally leg member 15 are opened out to support items for transport as shown. Strap 20 may be hooked to the frame to hold the items in place during transport. The end 4 of the backrest serves as a handle and the length of the two frames combined puts the handle up high enough for comfortable operation without stooping. The folding leg members are U shaped pieces 21 with cross members 22 for enhanced rigidity.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention within the scope of the appended claims.

We claim:

1. A folding device that operates as a rolling cart for transporting objects and as an adjustable lounge chair, said device comprising:
   A) a backrest frame having rigid, parallel, substantially straight side portions;
   B) a seat frame having rigid, parallel, substantially straight side portions defining a seat plane therebetween;
   C) adjustable hinge means pivotally attaching said backrest frame and said seat frame together at their first ends for fixedly securing said frames together at selectable angles therebetween including angles of about 180 degrees, and about zero degrees;
   D) a second end of said backrest frame providing a handle for use as a cart;
   E) a fabric web support means having two opposed broad faces attached to said frames and stretched between said sides to provide an object support surface on a first face for supporting objects transported by said cart and to provide a body support surface on a second face for supporting the body of an occupant of said chair;
   F) a pair of wheels attached to a second end of said seat frame, said wheels rotating about a common axis, said axis permanently disposed in a second plane parallel to said seat plane, said second plane spaced apart from and adjacent said first face of said fabric support web means, whereby said wheels are permanently disposed with a greater portion of said wheels extending beyond said first face and a lesser portion of said wheels extending beyond said second face for supporting said occupant, so that said wheels minimally interfere with said occupant of said chair;
   G) a plurality of foldable leg members pivotally attached to said sides of said frames arranged to fold substantially parallel to said frames in a folded position and extending downward to support said frames above a support surface for use as a chair; and
   H) one of said foldable leg members being attached at said second end of said seat frame and providing a second support for objects transported by said cart disposed transversely to said object support surface.

2. The device according to claim 1 in which said sides of said seat frame curve downward to curving ends at said second end and said wheels are mounted on a common axle means for supporting said wheels said axle means supported by said curving ends.

3. The device according to claim 1 in which said foldable leg members have a substantially U shape having parallel legs with a cross member joining said legs.

4. The device according to claim 1 in which one of said foldable leg members is attached at said first end of seat frame and provides a third support for objects transported by said cart disposed transversely to said object support surface.

5. A device having three operational modes, a rolling cart mode for transporting objects, an adjustable lounge chair mode for supporting the body of an occupant, and a storage mode in which said device is folded into a compact package, said device comprising:
   A) a backrest frame having rigid, substantially straight and parallel side portions, a first end providing a handle for use in said cart mode and a second, hinge end;
   B) a seat frame having rigid, substantially straight and parallel side portions, a first, foot end for supporting the lower portion of said body in said chair mode and a second, hinge end said second hinge end of said seat frame being pivotally connected to said second hinge end of said backrest frame;
   C) a fabric web support means having two opposed broad faces attached to said frames and stretched between said sides to provide an object support surface on a first face for supporting objects transported in said cart mode and to provide a body support surface on a second face for supporting the body of an occupant in said chair mode;
   D) a pair of wheels attached to said first, foot end of said seat frame, said wheels rotating about a common axis, said axis permanently disposed in a second plane parallel to said seat plane, said second plane spaced apart from and adjacent said first face of said fabric support web means, whereby said wheels are permanently disposed with a greater portion of said wheels extending beyond said first face and a lesser portion of said wheels extending beyond said second face for supporting said occupant, so that said wheels minimally interfere with said occupant of said chair, said wheels being coaxial and parallel to one another in all three operational modes;
   E) a plurality of foldable leg members pivotally attached to said sides of said frames arranged to fold substantially parallel to said frames in a folded position and extending downward to support said frames above a support surface for use as a chair; and
   H) one of said foldable leg members being attached at said foot end of said seat frame and providing a second support for objects transported by said cart, disposed transversely to said object support surface.

6. The device according to claim 5 in which said sides of said seat frame curve downward to curving ends at said first, foot end and said wheels are mounted on a rigid common axle means for rotatably supporting said wheels, said axle means being supported by said curving ends.

7. The device according to claim 5 in which said foldable leg members have a substantially U shape having parallel legs with a cross member joining said legs.

8. The device according to claim 5 in which a rigid common axle supports said wheels.

* * * * *